(12) United States Patent
Jimenez Cordon et al.

(10) Patent No.: US 11,849,351 B2
(45) Date of Patent: Dec. 19, 2023

(54) REMOVAL OF APPLICATION IDENTIFIER

(71) Applicant: Telefonaktiebolaget LM Ericsson (publ), Stockholm (SE)

(72) Inventors: Carlos Jimenez Cordon, Madrid (ES); Miguel Angel Muñoz De La Torre Alonso, Madrid (ES); Miguel Angel Puente Pestaña, Madrid (ES); Ruth Pallares Del Egido, Madrid (ES)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 230 days.

(21) Appl. No.: 17/295,572

(22) PCT Filed: Dec. 21, 2018

(86) PCT No.: PCT/EP2018/086689
§ 371 (c)(1),
(2) Date: May 20, 2021

(87) PCT Pub. No.: WO2020/104048
PCT Pub. Date: May 28, 2020

(65) Prior Publication Data
US 2022/0022097 A1    Jan. 20, 2022

(30) Foreign Application Priority Data
Nov. 21, 2018 (EP) .................... 18382839

(51) Int. Cl.
*H04W 28/00* (2009.01)
*H04W 28/06* (2009.01)
(Continued)

(52) U.S. Cl.
CPC ....... *H04W 28/065* (2013.01); *H04L 12/1407* (2013.01); *H04L 47/2483* (2013.01); *H04W 28/0215* (2013.01)

(58) Field of Classification Search
None
See application file for complete search history.

(56) References Cited

U.S. PATENT DOCUMENTS

| 11,290,382 B2 * | 3/2022 | Lee ..................... H04L 47/20 |
| 2018/0069798 A1 * | 3/2018 | Bacik .................. H04L 43/026 |
| 2018/0097700 A1 | 4/2018 | Navas Cornejo et al. |

FOREIGN PATENT DOCUMENTS

| CN | 101690090 A | 3/2010 |
| CN | 108064032 A | 5/2018 |

(Continued)

OTHER PUBLICATIONS

International Search Report and Written Opinion dated Oct. 9, 2019, for corresponding International Application No. PCT/EP2018/086689; consisting of 19-pages.

(Continued)

*Primary Examiner* — Gerald A Smarth
(74) *Attorney, Agent, or Firm* — Christopher & Weisberg, P.A.

(57) ABSTRACT

A method for operating a user plane entity configured to handle a user plane of data packet sessions exchanged in a cellular network, each data packet session comprising data packet flows of a plurality of applications, the data packet flows of each application being identified by an application identifier, the method includes: determining that a tracking of data packet flows identified by an application identifier should be stopped, determining one or more application detection filters configured to detect data packet flows identified by the application identifier, removing the one or more application detection filters and the application identifier from the user plane entity, and requesting a session control entity configured to control the data packet sessions to remove packet detection rules usable to detect the data (Continued)

packet flows identified by the application identifier, wherein the request includes the application identifier.

10 Claims, 10 Drawing Sheets

(51) Int. Cl.
*H04L 12/14* (2006.01)
*H04L 47/2483* (2022.01)
*H04W 28/02* (2009.01)

(56) References Cited

FOREIGN PATENT DOCUMENTS

| CN | 108419270 A | 8/2018 |
|---|---|---|
| WO | 2018082707 A1 | 5/2018 |
| WO | WO-2022205470 A1 * | 10/2022 |

OTHER PUBLICATIONS

3GPP TS 23.501 V15.3.0; 3rd Generation Partnership Project; Technical Specification Group Services and System Aspects; System Architecture for the 5G System; Stage 2 (Release 15), Sep. 2018; consisting of 226-pages.

3GPP TS 23.502 V15.3.0; 3rd Generation Partnership Project; Technical Specification Group Services and System Aspects; Procedure for the 5G System; Stage 2 (Release 15), Sep. 2018; consisting of 330-pages.

3GPP TS 23.214 V15.4.0; 3rd Generation Partnership Project; Technical Specification Group Services and System Aspects; Architecture enhancements for control and user plane separation of EPC nodes; Stage 2 (Release 15), Sep. 2018; consisting of 92-pages.

Chinese Office Action and English Summary dated Feb. 224, 2023 for Application No. 201880099478.0, consisting of 20 pages.

3GPP TS 23.214 V16.6.0; 3rd Generation Partnership Project; Technical Specification Group Services and System Aspects; Architecture enhancements for control and user plane separation of EPC nodes; Stage 2 (Release 14), Mar. 2018; consisting of 92-pages.

* cited by examiner

REMOVAL OF APPLICATION IDENTIFIER

CROSS-REFERENCE TO RELATED APPLICATIONS

This application is a Submission Under 35 U.S.C. § 371 for U.S. National Stage Patent Application of International Application No.: PCT/EP2018/086689, filed Dec. 21, 2018 entitled "REMOVAL OF APPLICATION IDENTIFIER," which claims priority to European Provisional Application No.: 18382839.1, filed Nov. 21, 2018, the entireties of both of which are incorporated herein by reference.

TECHNICAL FIELD

The present application relates to a method for operating a user plane entity, to a method for operating a session control entity, to a method for operating a policy control entity, and to a method for operating a packet flow description entity. Furthermore, the corresponding entities are provided, a system comprising at least some of the entities and a computer program comprising program code. Furthermore, a carrier comprising the computer program is provided.

BACKGROUND

Figure 1:
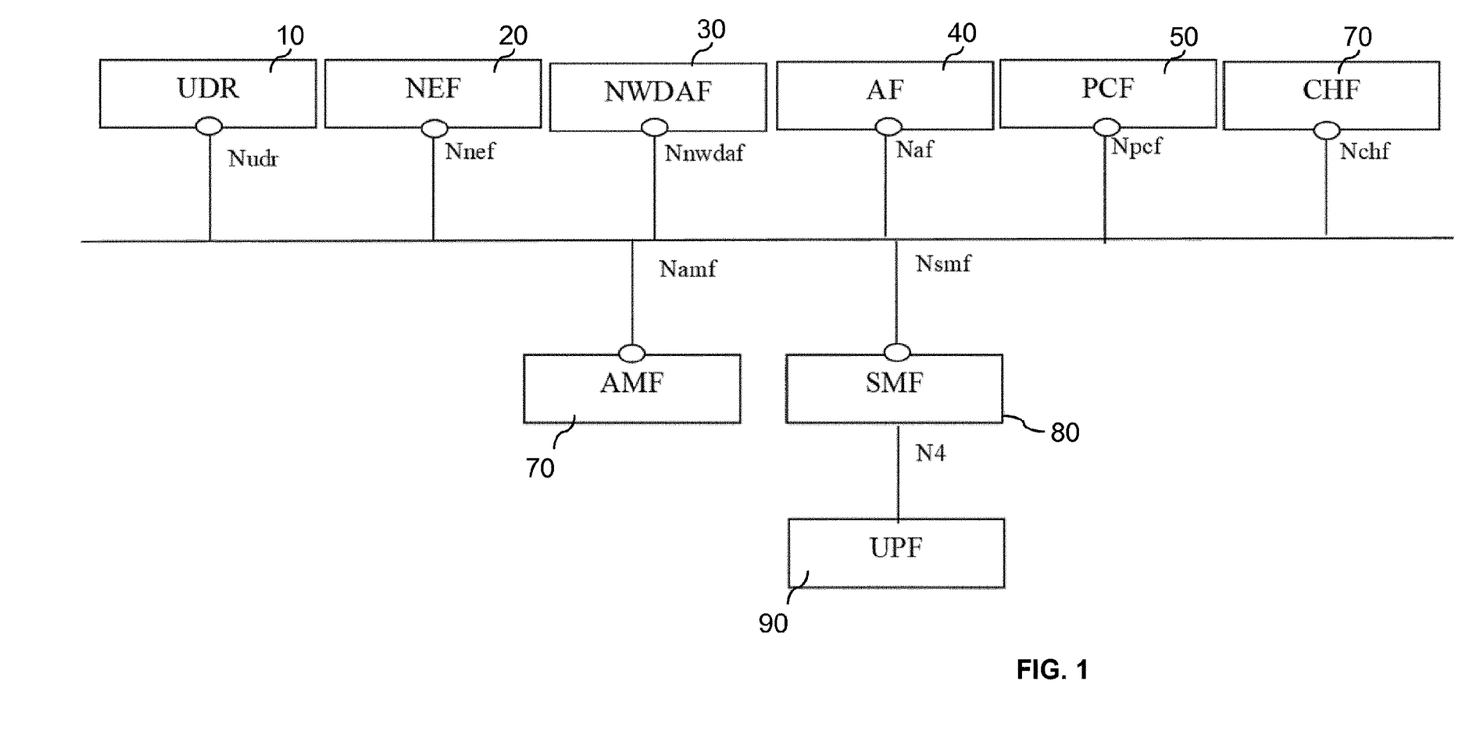
FIG. 1 shows a schematic architectural view of a 5G cellular network.

FIG. 1 shows the architecture of a 5G core network comprising the Unified Data Repository, UDR, 10, a Network Exposure Function, NEF, 20, a Network Data Analytics Function NWDAF, 30, an Application Function, AF, 40, a Policy Control Function, PCF, 50, a Charging Function, CHF, 60, an Access and Mobility Management Function, AMF, 70, a Session Management Function, SMF, 80, and a User Plane Function, UPF, 90.

The different functions provided by the different functional modules as shown in FIG. 1 is known to a person skilled in the art so that a detailed description of each of the entities is omitted for the sake of clarity. In the following only the function entities relevant for the present application will be discussed in more detail.

The PCF 50 includes the functionality of supporting a unified policy framework to govern network behavior. Furthermore, the function provides policy rules to control plane functions to enforce them and accesses subscription information relevant for the policy decisions in the UDR 10.

The SMF 80 supports different functionality such as session establishment, modification and release and policy related functionalities like termination of interfaces towards policy control functions, charging data collection, support of charging interfaces and control and coordination of charging data collection at UPF, 90.

The user plane function UPF 90 supports the handling of the user plane traffic and includes packet inspection, packet routing and forwarding, traffic usage reporting and quality of service, QOS, handling for the user plane, by way of example the uplink (UL) or downlink (DL) rate enforcement.

Figure 2:
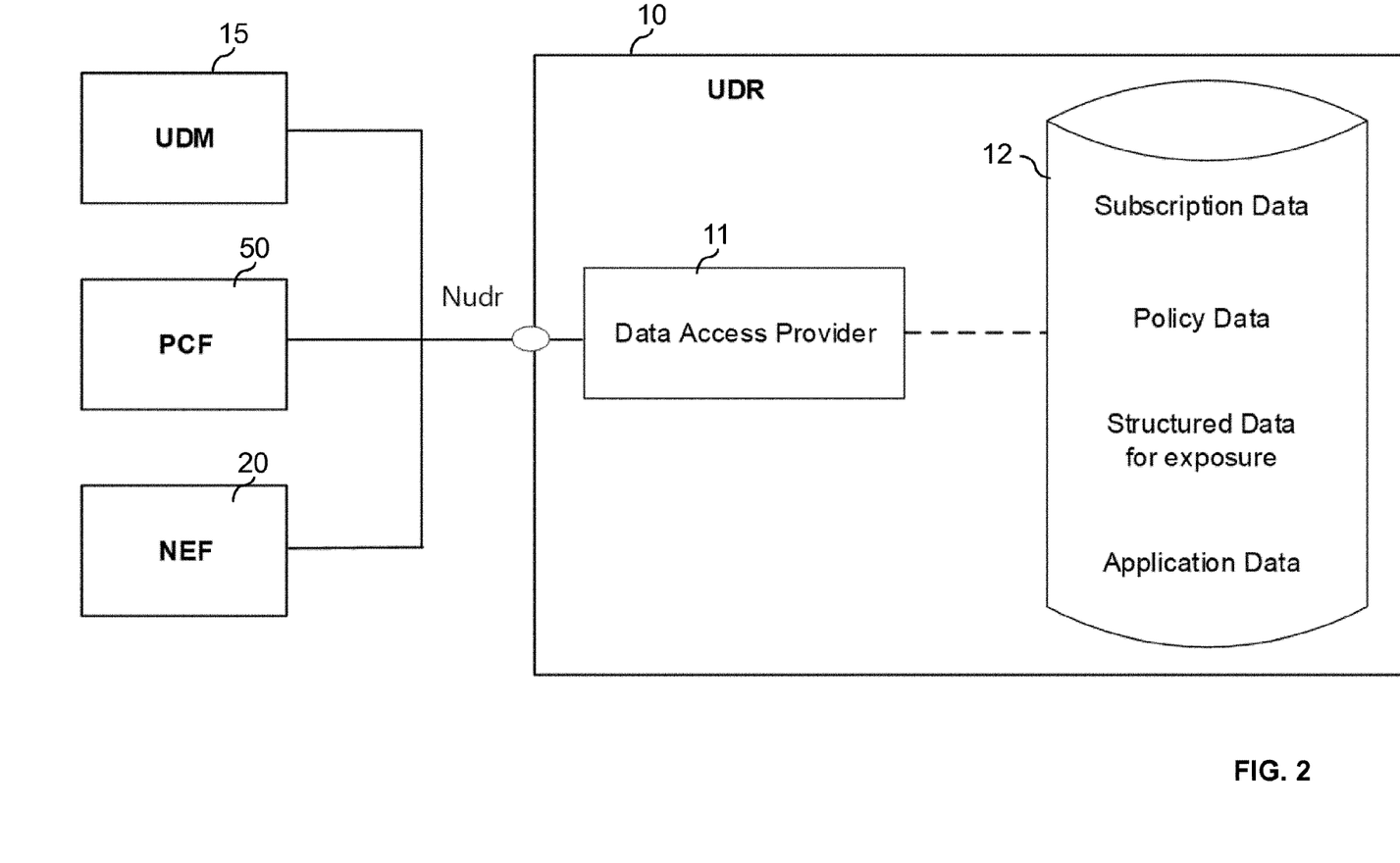
FIG. 2 shows a schematic example view of a data storage architecture used in a system as shown in FIG. 1.

FIG. 2 shows the data storage architecture of a 5G network which allows the UDM, Unified Data Management, 15, the PCF 50 and the NEF 20 to store data in the UDR 10 including subscription data and policy data by the UDM 15 and the PCF 50, structured data for exposure and application data including Packet Flow Descriptions, PFDs, for application detection by the NEF 20. The UDR 10 comprises a data access provider 11 providing access to storage 12 where data such as subscription data, policy data, structured data for exposure or application data are stored.

According to 3GPP TS 23.501 section 5.8.2.4 the SMF 80 controls the traffic detection at the UP function by providing detection information for every PDR (Packet Detection Rule). For IPv4 or IPv6 or IPv4v6 PDU (Packet Data Unit) Session type, detection information is a combination of several parameters, among them the Application Identifier (Application ID). The Application ID is an index to a set of application detection rules configured in UPF.

According to 3GPP TS 23.501, section 5.8.2.8 PCC (Policy and Charging Control) Related Functions, the application detection filters can be configured in the UPF identified by an Application ID. This applies to predefined PCC Rules as well as to Dynamic PCC Rules with ADC (Application Detection and Control).

In the same way that an Application ID containing the application detection filters can be locally provisioned in the UPF, it can also be locally removed in the UPF. The reason for removing an Application ID in use can be that the operator of the network does not want to track that application any more. Furthermore, it could be used as a kind of emergency procedure. An Application ID could be even deleted by mistake in the UPF 90.

Removing an Application ID in use in the UPF implies that all the PDRs using that Application ID are not valid anymore as they are not keeping the original filters. Invalidating these PDRs means that the PDRs to validate per session by the UPF will not be the same than the ones previously provisioned by the SMF 80. That means that the ongoing sessions will be impacted. Therefore, the removal of an Application ID in use in the UPF 90 can lead to a misalignment of data between the PCF 50, SMF 80 and UPF 90.

On the other hand, if an operator wants to remove an Application ID, a possible procedure according to the current specifications can be to follow a top-down approach as follows:

PCF 50 should:
  Request UDR 10 to remove any reference to that Application ID (i.e. remove Application ID as part of subscriber policy data stored in UDR)
  Per session: deactivate/remove any PCC rule (both dynamic and predefined) using that Application ID for any existing user session.
PFDF [Packet Flow Description Function (optional NF)] should remove that Application ID (+definition) from its records.
SMF 80 should invalidate all the PDRs using this Application ID
UPF 90 should remove the Application ID definition containing the application detection filters However, this procedure is quite complex and requires a lot of signaling.

SUMMARY

Accordingly, a need exists to provide an effective way to remove an application identifier for a certain traffic in the network.

This need is met by the features of the independent claims. Further, aspects are described in the dependent claims.

According to a first aspect a method is provided for operating a user plane entity which is configured to handle a user plane of data packet session exchanged in a cellular network wherein each data packet session comprises data packet flows of a plurality of applications and the data packet flows of each application are identified by an application identifier. The user plane entity determines that a tracking of the data packet flows identified by an application identifier should be stopped. Furthermore, one or more application detection filters are determined which are configured to detect data packet flows identified by the application identifier. Furthermore, the one or more application detection filters and the application identifier are removed from the user plane entity, and the user plane entity requests a session control entity configured to control the data packet sessions to remove the packet detection rules useable to detect the data packet flows identified by the application identifier. The request furthermore includes the application identifier.

With the above described method a mechanism is provided by which the user plane entity removes packet detection rules with the application identifier and informs a session control entity about an application identifier removal.

Furthermore, the corresponding user plane entity is provided comprising a memory and at least one processing unit wherein the memory contains instructions executable by the at least one processing unit wherein the user entity is operative to work as discussed above or as discussed in further detail below.

Alternatively a user plane entity is provided configured to handle a user plane of data packet sessions exchanged in the cellular network wherein the user plane entity comprises a first module configured to determine that a tracking of the data packet flows identified by an application identifier should be stopped. The user plane entity furthermore comprises a second module configured to determine one or more application detection filters configured to detect data packet flows identified by the application identifier. A third module is configured to remove the one or more application detection filters and the application identifier from the user plane entity. A fourth module of the user plane entity is configured to request the session control entity to remove the packet detection rules usable to detected data packet flows identified by the application identifier, wherein the request includes the application identifier.

According to another aspect of the application a method is provided for operating a session control entity which is configured to control data packet sessions exchanged in the cellular network wherein each data packet session comprises data packet flows of a plurality of applications and wherein the data packet flows of each application are identified by an application identifier. The session control entity receives a request to remove packet detection rules usable to detect data packet flows identified by an application identifier, wherein the request includes the application identifier. The session control entity then determines at least one packet detection rule which includes the application identifier and removes the at least one packet detection rule in the session control entity in response to the received request. Furthermore, a policy control entity is requested to update policy and charging control rules in the policy control entity by removal of the application identifier. The request transmitted to the policy control entity furthermore includes the application identifier.

The session control entity receiving the request determines the packet detection rules having the included application identifier, removes the packet detection rule or rules and requests a policy control entity to update the policy and charging control rules accordingly. Accordingly, the data in the session control entity and the policy control entity are aligned and are consistent so that a consistency between these nodes is obtained.

Furthermore, the corresponding session control entity is provided configured to control the data packet sessions exchanged in the cellular network wherein the session control entity comprises a memory and at least one processing unit, wherein the memory contains instructions executable by the at least one processing unit. The session control entity is operative to work as discussed above or as discussed in further detail below.

As an alternative a session control entity configured to control data packet sessions exchanged in a cellular network is provided, wherein the session control entity comprises a first module configured to receive a request to remove packet detection rules usable to detect data packet flows identified by the application identifier and wherein the request includes the application identifier. The session control entity comprises a second module configured to determine at least one packet detection rule which includes the application identifier and comprises a third module configured to remove the at least one packet detection rule in the session control entity in response to the received request. The session control entity furthermore comprises a fourth module configured to request the policy control entity to update the policy and charging control rules accordingly by removing the application identifier wherein the request includes the application identifier.

Furthermore, a method is provided for operating a policy control entity which is configured to make policy decisions for data packet sessions exchanged in a cellular network wherein each data packet session comprises data packet flows of a plurality of applications and wherein the data packet flows of each application are identified by an application identifier. The policy control entity receives a request from the session control entity to update policy and charging control rules in the policy control entity with the removal of an application identifier wherein the request as received includes the application identifier. The policy control entity then determines one or more policy and charging control rules which include the application identifier and removes the application identifier from the determined one or more policy charging control rules in response to the received request.

With this method the policy control entity can be kept consistent with the session control entity which removed the packet detection rule including the application identifier.

Furthermore, the corresponding policy control entity is provided configured to make policy decisions for data packet sessions exchanged in the cellular network wherein the policy control entity comprises a memory and at least one processing unit wherein the memory contains instructions executable by the at least one processing unit wherein the policy control entity is configured to operate as discussed above or as discussed in further detail below.

As an alternative a policy control entity configured to make policy decisions for data packet sessions exchanged in a cellular network is provided, wherein the policy control entity comprises a first module configured to receive a request from a session control entity to update the policy and charging control rules by removal of an application identifier identified in the request. A second module is provided configured to determine one or more policy and charging control rules which include the application identifier. A third module of the policy control entity is configured to remove the application identifier from the determined one or more policy and charging control rules in response to the received request.

Furthermore, a method is provided for operating a packet flow description entity which is configured to store application identifiers and associated packet flow descriptions for data packet sessions exchanged in the cellular network. Each data packet session comprises data packet flows of a plurality of applications and the data packet flows of each application are identified by an application identifier. The packet flow description entity receives a request to remove an application identifier and associated packet flow descriptions, wherein the request includes the application identifier. Furthermore, one or more packet flow descriptions are determined which are associated with the application identifier and the application identifier and the determined one or more packet flow descriptions are removed in response to the received request.

With the method for the packet flow description entity this entity is also aligned with the session control entity and the policy control entity in case an application identifier has been removed.

Furthermore, the corresponding packet flow description entity is provided comprising a memory and at least one processing unit wherein the memory contains instructions executable by the at least one processing unit. The packet flow description entity is operative as discussed above or as discussed in further detail below.

As an alternative a packet flow description entity is provided which is configured to store application identifiers and associated packet flow descriptions for data packet sessions exchanged in the cellular network wherein the packet flow description entity comprises a first module configured to receive a request to remove an application identifier and associated packet flow descriptions, the request including the application identifier to be removed. A second module is provided configured to determine one or more packet flow descriptions associated with the application identifier and the packet flow description entity comprises a third module configured to remove the application identifier and the determined one or more packet flow descriptions in response to the received request.

Furthermore, a system is provided comprising at least two of the above described entities.

Additionally, a computer program comprising program code to be executed by at least one processing unit of the session control entity, of the user plane entity, of the policy control entity or of the packet flow description entity is provided, wherein the execution of the program code causes the at least one processing unit to execute a method as discussed above or as discussed in further detail below.

Furthermore, a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above mentioned aspects and embodiments described below may be combined with each other in other embodiments unless explicitly mentioned otherwise.

Other devices, systems, methods and features will become apparent to one with skill in the art upon examination of the following detailed description and Figures. It is intended that all such additional features and advantages be included within this description, be within the scope of the invention and be protected by the following claims.

DETAILED DESCRIPTION

In the following, embodiments of the invention will be described in detail with reference to the accompanying drawings. It is to be understood that the following description of embodiments is not to be taken in a limiting sense. The scope of the invention is not intended to be limited by embodiments described hereinafter or by the drawings, which are to be illustrative only.

The drawings are to be regarded as being schematic representations, and elements illustrated in the drawings are not necessarily shown to scale. Rather the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established or a wired or wireless connection. Functional blocks may be implemented in hardware, software, firmware, or a combination thereof.

Within the context of the present application the term user entity or user equipment, UE, refers to a device used by a person for his or her personal communication. It may be a telephone type of device, a cellular telephone, a mobile station, cordless phone, or personal digital assistant type of device like laptop, notebook, notpad, tablet equipped with a wireless data connection. The UE may also be associated with non-humans like animals, plants or machines.

In the following a mechanism is described in which a user plane entity informs a session control entity about an application identifier removal. The session control entity then informs the policy control entity and if present a packet flow description entity as well.

This solution can be based on existing 3GPP standards which may be extended by extending the N4 interface to support the user plane entity or user plane function to notify the session management entity or session management function of the removal of an application ID.

Furthermore, the $N_{pfc}$ interface may be extended to support the session control entity to notify the policy control entity of the removal of the application identifier, and the $N_{pdfd}$ interface may be extended to support the session control entity to notify the packet flow description entity of the removal of an application identifier.

The packet flow description entity may be implemented as packet flow description function, PFDF, the policy control entity may be implemented as PCF or policy control function, the session control entity may be implemented as session management function, SMF, and the user plane entity may be implemented as user plane function, UPF.

This session management entity can then notify on a per application basis the policy control entity and PFDF of the removal of the application identifier.

The invention will be described further below with reference to the following use case example.

A network operator wants to charge in a different way any Facebook traffic than Facebook messenger. To this end two application identifiers are identified in the user plane function, one to match all Facebook traffic and another one to match just the Facebook messenger traffic.

To achieve what it is stated above, SMF has instructed on per PFCP session:

A PDR to match all Facebook traffic linked to one URR-ID (Usage Reporting Rule-ID)

A PDR to match Facebook Messenger traffic linked to a different URR-ID and with higher precedence than the above PDR.

For whatever reason, the network operator decides to charge in the same way any Facebook traffic and, therefore, only the Application-ID that matches all the Facebook Messenger traffic is needed.

Figure 3:
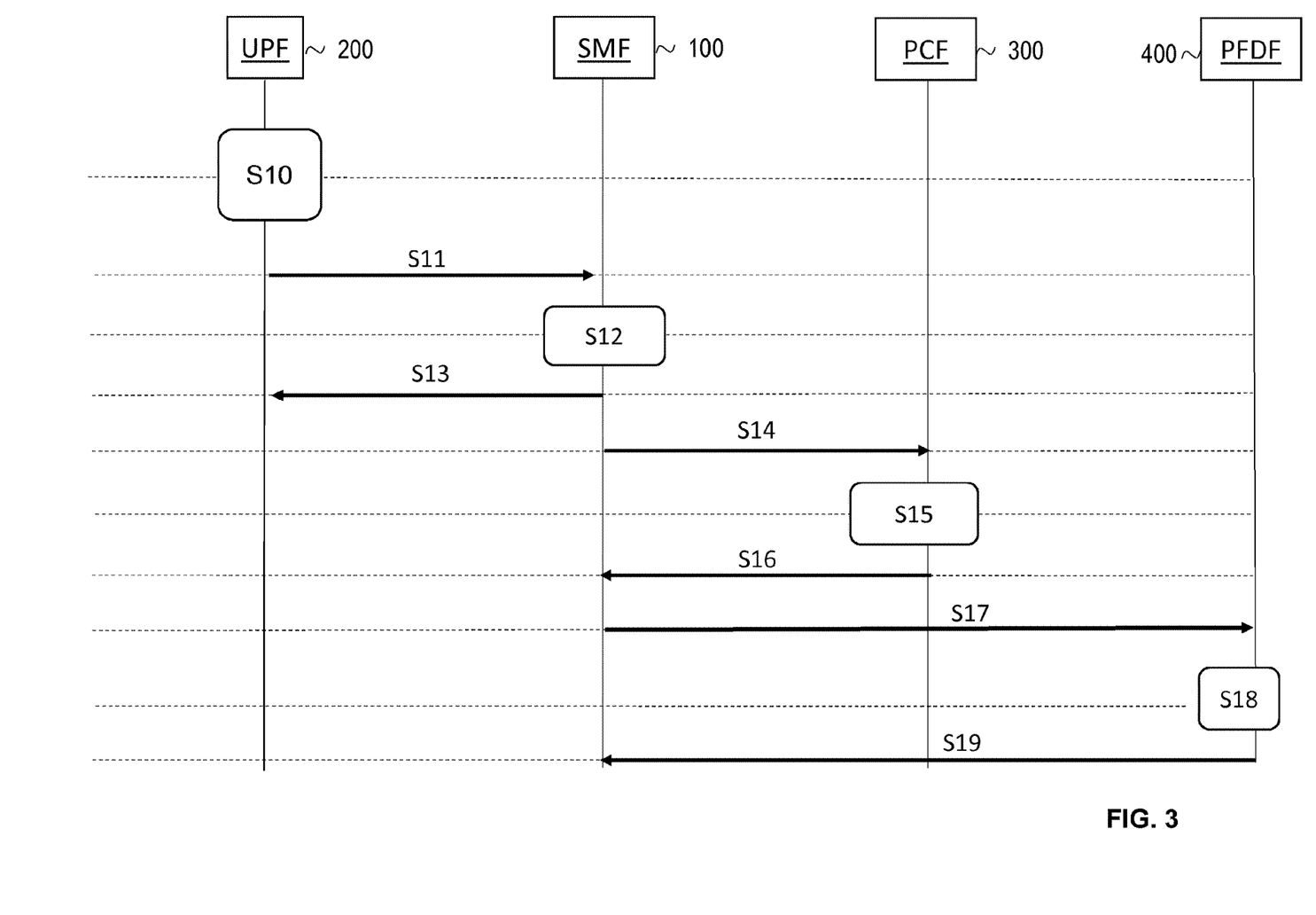
FIG. 3 shows an example flowchart of a method carried out by the entities involved in a situation when an application identifier is removed in an effective way.

The sequence diagram to remove the Application-Id for Facebook Messenger is shown in FIG. 3. Steps are detailed below:

In steps S10 and S11 the Operator wants to stop tracking the target application (e.g. Facebook Messenger) and the corresponding Application ID with the application detection filters are deleted locally in the UPF 200. UPF 200 triggers a per node PFCP Node Level Procedure (PFCP Application ID Removal Request) to inform the SMF 100 of the removal of that Application ID.

In step S12 the SMF 100 removes the PDR's with the Application ID received in the PFCP Application ID Removal Request, if any. It should be noted that a PDR can only have a single Application ID (step S12).

SMF responds back to UPF (PFCP Application ID Removal Response) in step S13.

In step S14 the SMF 100 notifies PCF 300 of the removal of the Application ID on a per application basis (Npcf Application ID Removal Request).

Steps S15 and S16 the PCF 300 updates the PCC rules accordingly and respond back to SMF (Npcf Application ID Removal Response).

In step S17 the SMF 300 notifies PFDF 400 of the removal of the Application ID (Npfdf Application ID Removal Request).

In steps S18 and S19 the PFDF 400 removes the Application ID (and corresponding PFDs) from UDR (not depicted in FIG. 3 for simplicity) and responds back to SMF 100 (Npfdf Application ID Removal Request Response).

The solution discussed above was described in connection with a 5G network architecture. However, the same mechanism can be applied to a 4G or LTE network by replacing the PCF by PCRF, by replacing the SMF by the packet gateway controller, PGW-C or TDF-C. The user plane function 200 can be replaced by a packet gateway user plane, PGW-U or Traffic Detection Function, TDF, -U.

Figure 4:
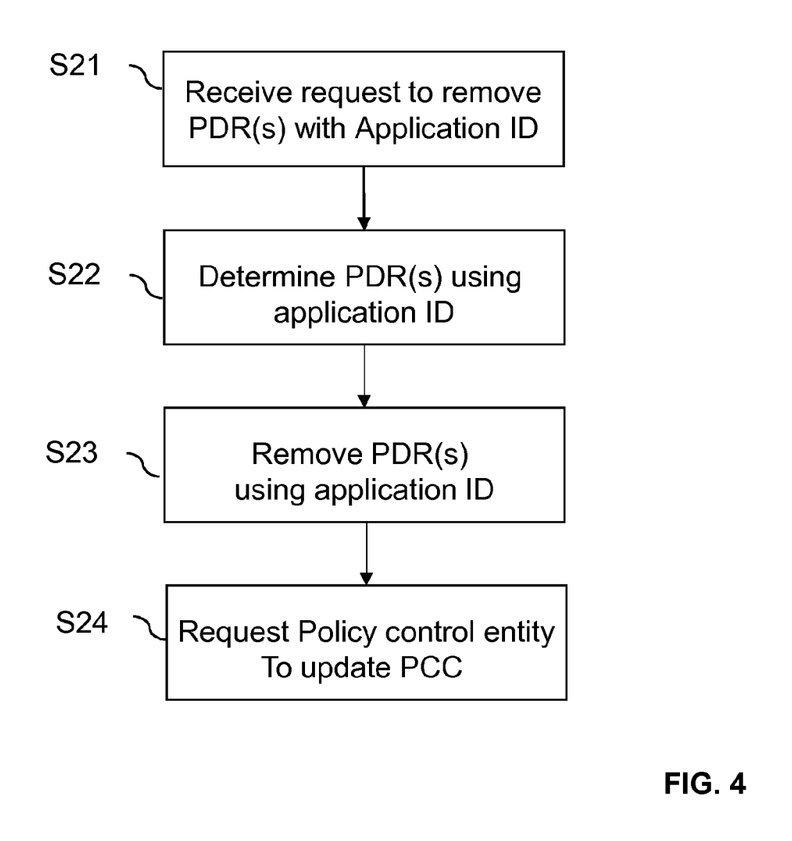
FIG. 4 shows an example flowchart of a method carried out by a session control entity in the message exchange shown in FIG. 3.

FIG. 4 summarizes the steps carried out by the SMF 100. In step S21 the SMF 100 receives the request to remove packet detection rules which are used to detect data packet flows identified by an application identifier. In step S22 the SMF 100 determines at least one packet detection rule which includes the application identifier and in step S23 the at least one packet detection rule identified in step S22 is removed from the SMF 100. Furthermore, in step S24 the PCF 300 is requested to update the policy and charging control rules accordingly by removing the application identifier.

Figure 5:
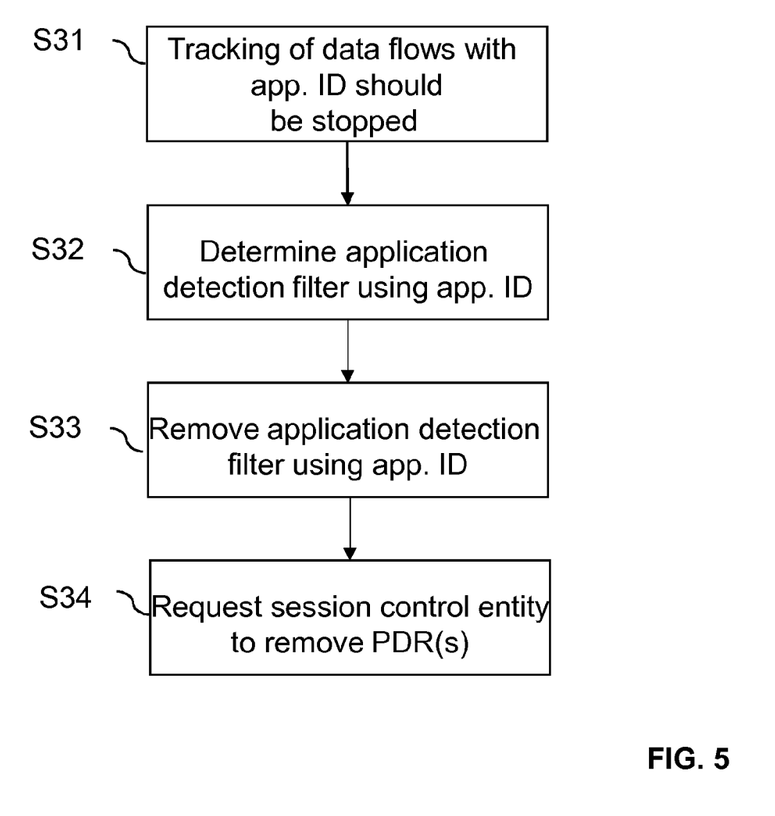
FIG. 5 shows an example flowchart of a method carried out at a user plane entity in the situation shown in FIG. 3.

FIG. 5 summarizes the steps carried out by UPF 200 in the method discussed above. In step S31 it is determined that the tracking of a data packet flow identified by application identifier or any data packet flows identified by the application identifier should be stopped e.g. based on a request by an operator. In step S32 one or more application detection filters are determined which detect data packet flows identified by the application identifier. In step S33 the corresponding determined application detection filters and the application identifier are removed from the user plane entity and in step S34 the SMF 100 is asked to remove any packet detection rule that is used to detect the data packet flows identified by the application identifier included in the request.

Figure 6:
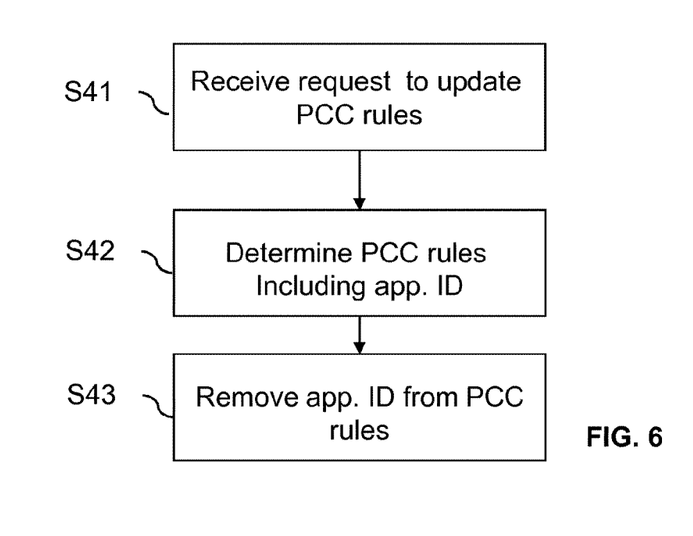
FIG. 6 shows an example schematic flowchart of a method carried out by a policy control entity in the situation of FIG. 3 in order to keep consistency between the nodes in case of a removal of an application identifier.

FIG. 6 summarizes the steps carried out by the PCF 300 in the method of FIG. 3. In a step S41 a request is received from the SMF 100 to update the policy and charging control rules with the removal of the an application identifier, wherein the request includes the application identifier. In step S42 the policy and charging control rules which include the application identifier are determined and in step S43 the application identifier is removed from the determined policy and charging control rules.

Figure 7:
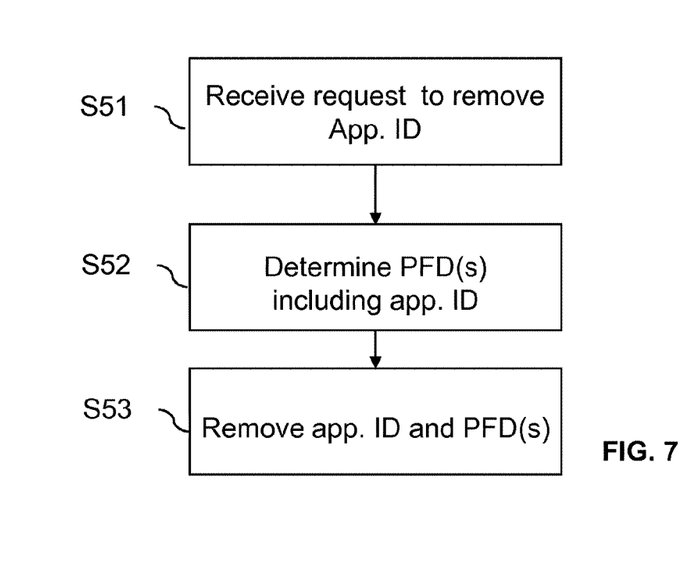
FIG. 7 shows an example flowchart of a method carried out by a packet flow description entity in the context of a removal of an application identifier as shown in FIG. 3.

FIG. 7 summarizes the steps carried out by the packet flow description function, PFDF 400 wherein in step S51 the request to remove an application identifier and associated packet flow description is received. In step S52 the packet flow descriptions associated with the application identifier are determined and are removed in step S53.

Figure 8:
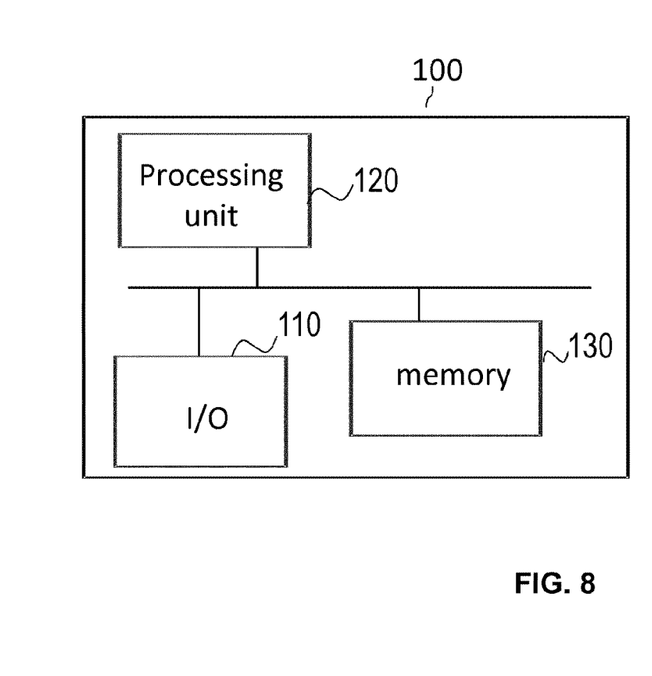
FIG. 8 shows an example schematic representation of a session control entity configured to control data packet sessions and configured to keep the data consistent between nodes in case of a removal of an application identifier.

FIG. 8 shows a schematic architectural view of the SMF 100 which can carry out the above discussed steps in which SMF 100 is involved as shown in FIG. 3. The SMF 100 comprises an input/output or interface 110 which is configured for transmitting user data and control messages to other entities and is configured to receive user data and control messages from other entities. By way of example the input/output 110 is configured to receive the request from the UPF 200 as shown in FIG. 3 in step S11. The input/output 110 is furthermore configured to transmit the request to the PCF 300 or to the PFDF 400 that the application identifier should also be removed in the other nodes. The SMF 100 furthermore comprises a processing unit 120 which is responsible for the operation of the SMF 100. The processing unit 120 comprises one or more processors and can carry out instructions stored on a memory 130, wherein the memory may include a read-only memory, random access memory, mass storage, a hard disk or the like. The memory furthermore includes suitable program code to be executed by the processing unit so as to implement the above described functionalities in which the SMF 100 is involved.

Figure 9:
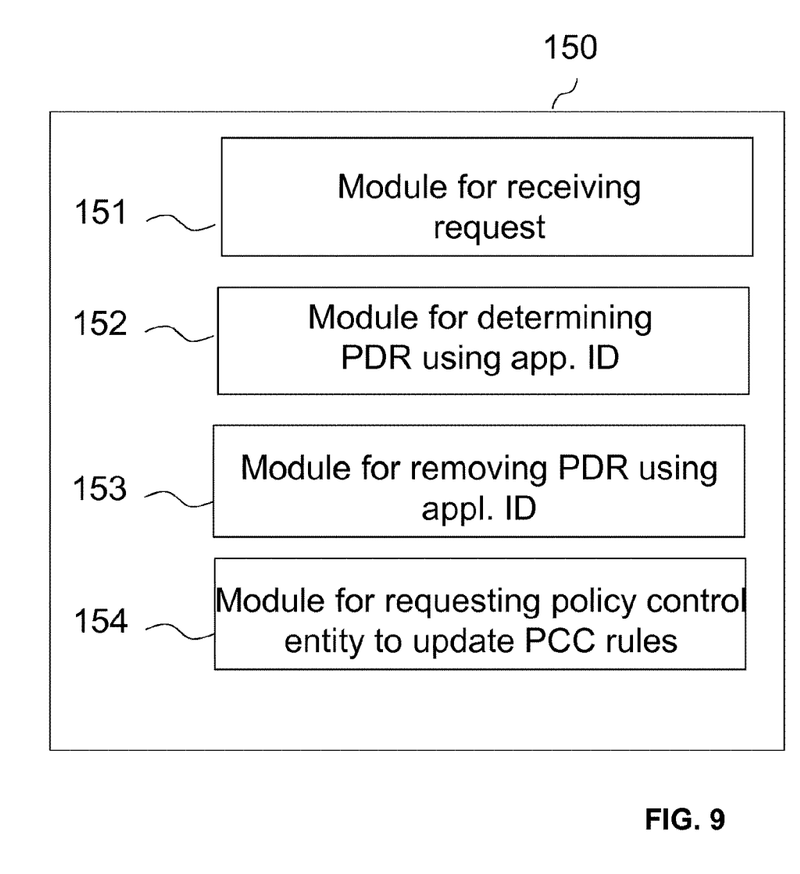
FIG. 9 shows another example schematic representation of a session control entity as shown in FIG. 8.

FIG. 9 shows another example schematic representation of an SMF 150 which comprises a first module configured to receive the request to remove the packet detection rule including the application identifier. The SMF 150 comprises a second module 152 configured for determining the packet detection rules which include the application identifier. A third module 153 is provided configured to remove the packet data detection rule as determined by a module 152 which includes the application identifier and a module 154 is provided configured to request the policy control entity to update the policy and charging control rules in the PCF 300 accordingly.

Figure 10:
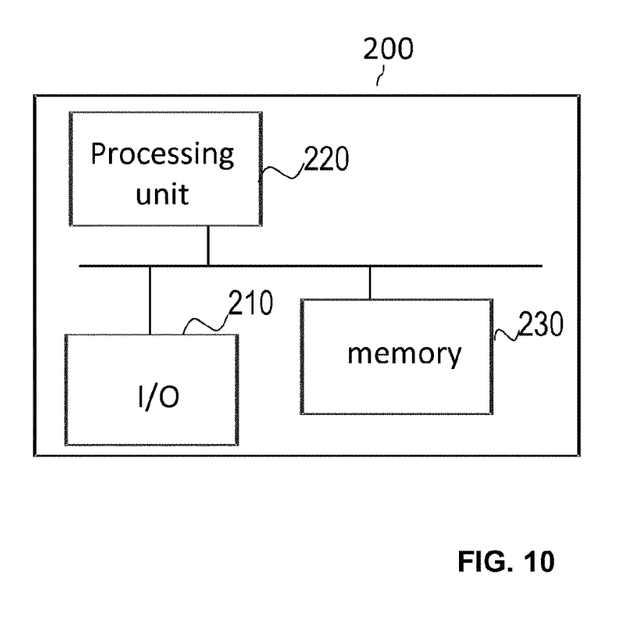
FIG. 10 shows an example schematic representation of a user plane entity handling the user plane of data packet sessions configured to keep data consistency when an application identifier and application detection filters are removed.

FIG. 10 shows a schematic architectural view a user plane function 200 which can carry out the above discussed removal of the application detection filters. The UPF 200 comprises an input/output or interface 210 which is provided for transmitting user data and/or control messages to other entities and provided for receiving user data and/or control messages from other entities. The input/output 210 can be configured to transmit and receive the messages as indicated in FIG. 3. The UPF 200 furthermore comprises a processing unit 220 which is responsible for the operation of the UPF 200. The processing unit 220 comprises one or more processors and can carry out instructions stored on a memory 230, wherein the memory may include a read-only memory, a random access memory, a mass storage, hard disk or the like. The memory can furthermore include suitable program code to be executed by the processing unit 220 so as to implement the above described functionalities in which the user plane function is involved.

Figure 11:
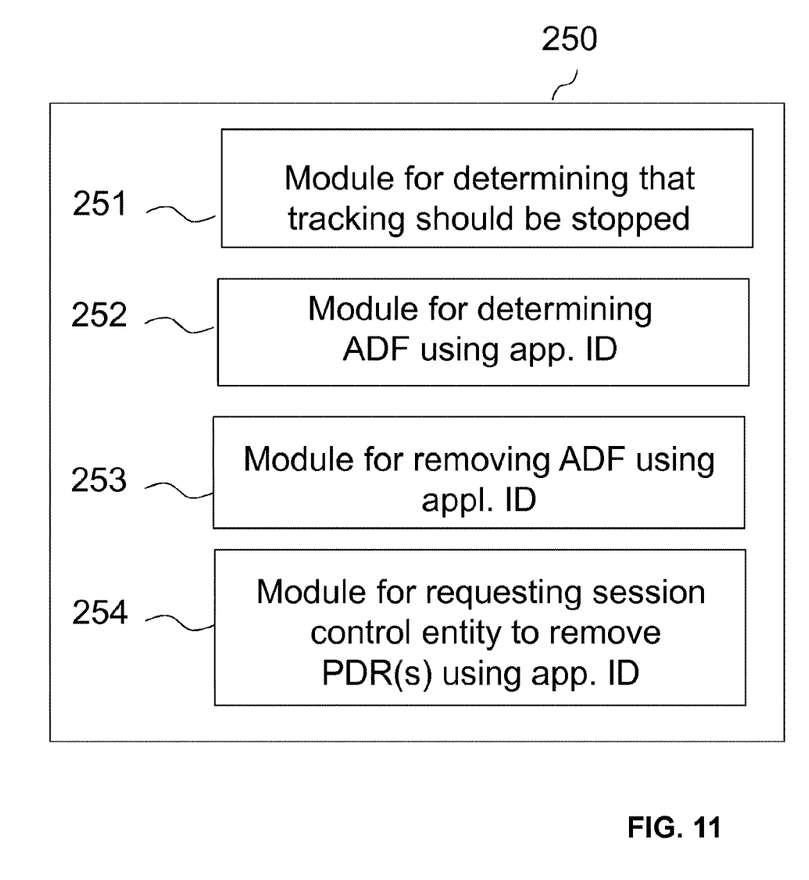

FIG. 11 shows another schematic architectural view of the user plane function 250 which comprises a first module 251 configured for determining that a tracking of data packet flows identified by an application identifier should be stopped. A module 252 is provided configured to determine the one or more application detection filters which are configured to detect data packet flows identified by the application identifier. A module 253 is provided configured to remove the detected application detection filter or filters and a module 254 is provided configured to request the SMF 100 to remove packet detection rules which are usable to detect data packet flows identified by the application identifier.

Figure 12:
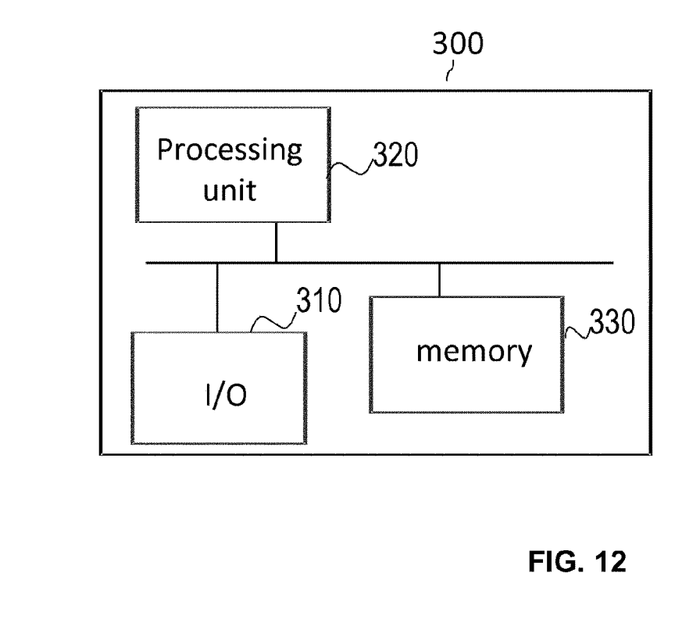
FIG. 12 shows an example schematic representation of a policy control entity configured to keep a data consistency between the nodes in case of a removal of an application identifier.

FIG. 12 shows an example schematic architectural view of a policy control function 300 which can operate as discussed above. The PCF 300 comprises an input/output or interface 310 configured to transmit user data and control messages and configured to receive user data and control massages as discussed above in connection with FIG. 3. The PCF furthermore comprises a processing unit 320 which is responsible for the operation of the PCF 300. The processing unit 320 comprises one or more processors and can carry out instructions stored on a memory 330, wherein the memory may include a read-only memory, a random access memory, a mass storage, a hard disk or the like. The memory 320 can furthermore include suitable program code to be executed by the processing unit 320 so as to implement the above described functionalities in which the PCF is involved.

Figure 13:
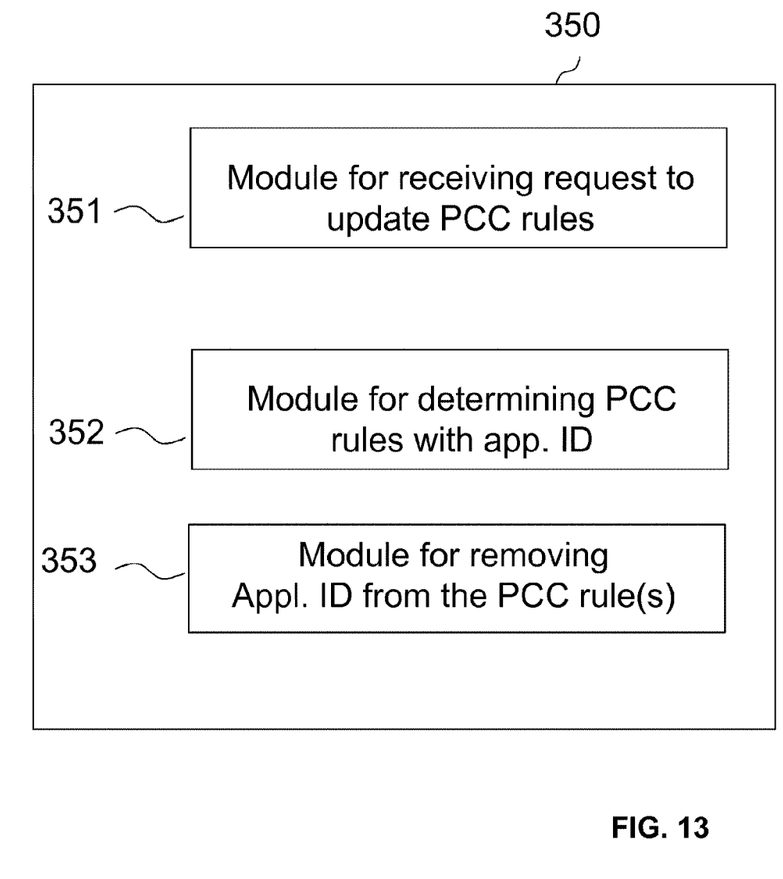
FIG. 13 shows another example schematic representation of a policy control entity as shown in FIG. 12.

FIG. 13 shows another schematic architectural view of a PCF 350 which comprises a first module 351 configured to receive the request from the SMF 100 to update the policy and charging control rules. A module 352 is provided configured to determine one or more policy and charging control rules which include the application identifier, and a module 353 is provided configured to remove the application identifier from the determined policy and charging control rules.

Figure 14:
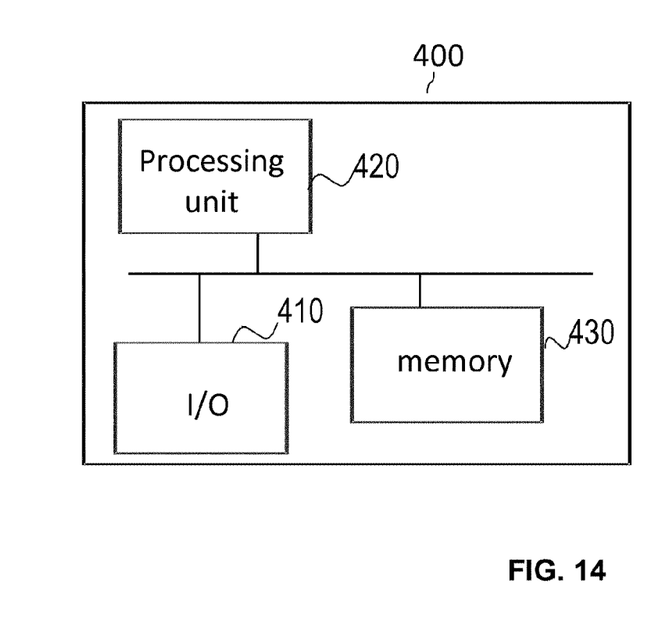
FIG. 14 shows an example schematic representation of a packet flow description entity configured to keep data consistency between the nodes in case of a removal of an application identifier.

FIG. 14 shows a schematic architectural view of the PFDF 400 which comprises an input/output or interface 410 configured for transmitting user data and control messages to other entities and configured to receive user data and control messages from other entities. The input/output 410 especially configured to receive the message from the SMF 100 as discussed above in connection with step S17 and to transmit the message in step S19. PFDF 400 comprises a processing unit 420 which is responsible for the operation of the PFDF 400. The processing unit 420 comprises one or more processors and can carry out instructions stored on a memory 430, wherein the memory may include a read-only memory, a random access memory, a mass storage, a hard disk or the like. The memory 430 may furthermore include suitable program code to be executed by the processing unit 420 so as to implement the above described functionalities in which the PFDF 400 is involved.

Figure 15:
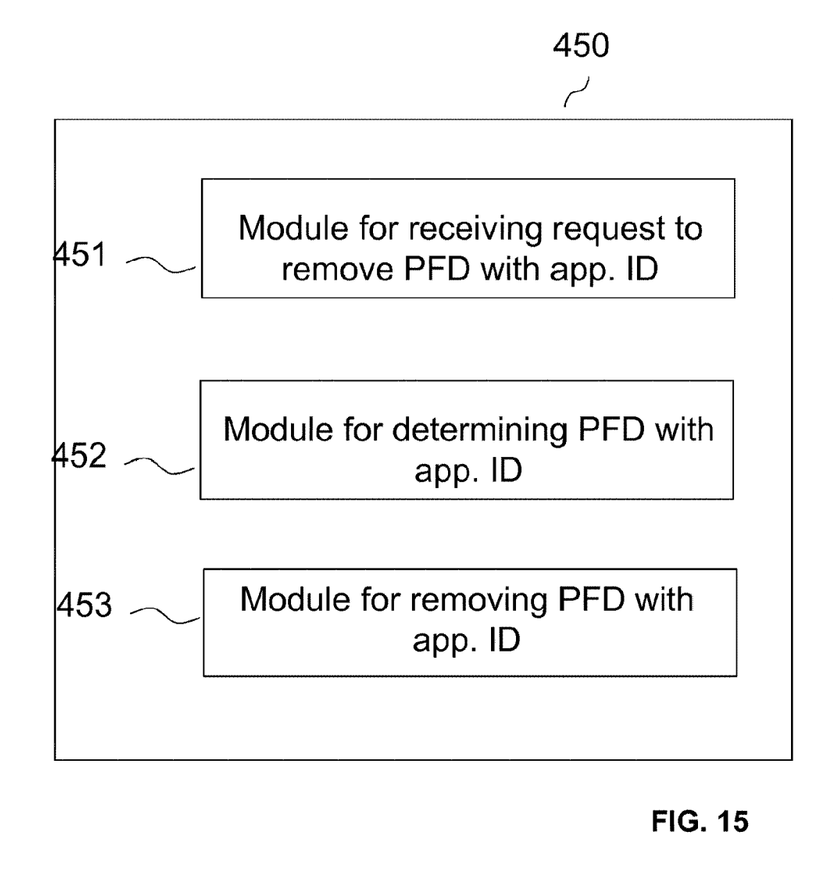
FIG. 15 shows another example schematic representation of a packet flow description entity as shown in FIG. 14.

FIG. 15 shows another schematic architectural view of a PFDF 450 comprising a first module 451 configured to receive the request to remove the application identifier and associated packet flow descriptions including the application identifier. A second module 452 is provided configured to determine one or more packet flow descriptions associated with the application identifier, and a module 453 is provided configured to remove the application identifier and the determined packet flow descriptions in response to the received request.

From the above said some general conclusions can be drawn for the different involved entities.

As far as to user plane function 200 is concerned the user plane function may receive a response from the session control entity or session control function 100 that the packet detection rules usable to detect the data packet flows identified by the application identifier have been removed. This was discussed above in connection with step S13 of FIG. 3.

Furthermore, the session control function 100 can be requested to remove the packet detection rule using a packet forwarding control protocol PFCP.

As far as the SMF 100 is concerned the SMF 100 can request the PFDF 400 to remove the application identifier and one or more associated packet flow descriptions in the packet flow description function.

The SMF 100 can furthermore receive a confirmation response from the PCF 300 that the policy and charging rules have been updated by removal of the application identifier. This was discussed above in connection with step S16 of FIG. 3.

As shown in the step S11 the request to remove the packet detection rules can be received from the UPF 200 which handles the user plane of the data packet sessions.

As far as the PCF 300 is concerned the PCF can furthermore confirm that the policy and charging control rules have been updated by removing the application identifier, wherein this confirmation is sent to the SMF 100 as discussed above in connection with step S16.

As far as the PFDF 400 is concerned the removal of the application identifier and the removal of the associated packet flow descriptions can be confirmed to the SMF 100 as discussed above in connection with step S19.

The above discussed invention has the following advantages:

A higher flexibility is provided in the removal of an application identifier as it is not limited to the deletion of an application identifier following a top-down approach from the PCF to the SMF and then to the UPF.

Furthermore, it avoids misalignment of provision data in the UPF 200, the SMF 100 and the PCF 300. Accordingly the data consistency between these notes is improved. Furthermore, the above discussed solution allows a removal of an application identifier that is referring to an application instead of taking removal actions on a per user basis so that the signaling between the UPF 200, the SMF 100 and the PCF 300 is significantly reduced.

The invention claimed is:

1. A session control entity configured to control data packet sessions exchanged in a cellular network, each data packet session comprising data packet flows of a plurality of applications, and the data packet flows of each application being identified by an application identifier, the session control entity comprising a memory and at least one processing unit, the memory containing instructions executable by the at least one processing unit, the session control entity being configured to:
   receive from a user plane entity a request to remove packet detection rules usable to detect data packet flows identified by an application identifier, the request to remove packet detection rules including the application identifier;
   determine at least one packet detection rule which includes the application identifier;
   remove the at least one packet detection rule in the session control entity in response to the received request from the user plane entity; and
   request a policy control entity to update policy and charging control rules in the policy control entity by removal of the application identifier, the request to update policy and charging rules including the application identifier.

2. The session control entity according to claim 1, further configured to request a packet flow description entity, which is configured to store application identifiers and associated packet flow descriptions, to remove the application identifier and one or more associated packet flow descriptions in the packet flow description entity.

3. The session control entity according to claim 2, further configured to receive a confirmation response from the policy control entity that the policy and charging control rules have been updated by removal of the application identifier.

4. The session control entity according to claim 3, wherein the request to remove the packet detection rules is received from a user plane entity configured to handle a user plane of the data packet sessions.

5. The session control entity according to claim 2, wherein the request to remove the packet detection rules is received from a user plane entity configured to handle a user plane of the data packet sessions.

6. The session control entity according to claim 1, further configured to receive a confirmation response from the policy control entity that the policy and charging control rules have been updated by removal of the application identifier.

7. The session control entity according to claim 6, wherein the request to remove the packet detection rules is received from a user plane entity configured to handle a user plane of the data packet sessions.

8. The session control entity according to claim 1, wherein the request to remove the packet detection rules is received from the user plane entity configured to handle a user plane of the data packet sessions.

9. A policy control entity configured to make policy decisions for data packet sessions exchanged in a cellular network, each data packet session comprising data packet flows of a plurality of applications, and the data packet flows of each application being identified by an application identifier, the policy controller comprising a memory and at least one processing unit, the memory containing instructions executable by said at least one processing unit, the policy control entity being configured to:
   receive a request from a session control entity to update policy and charging control rules in the policy control entity by removal of an application identifier, the request including the application identifier;
   determine one or more policy and charging control rules which include the application identifier; and
   remove the application identifier from the determined one or more policy and charging control rules in response to the received request.

10. The policy control entity according to claim 9 further configured to confirm that the policy and charging control rules have been updated by removal of the application identifier to the session control entity.

* * * * *